ALVIN G. MOORE
WILFRED C. SCHUEMANN
*INVENTORS*

BY *William F. Smith*

AGENT

# United States Patent Office 3,626,765
Patented Dec. 14, 1971

3,626,765
FLUID JET DEFLECTION TYPE INSTRUMENT
Alvin G. Moore, Cumberland, and Wilfred C. Schuemann, Rawlings Heights, Rawlings, Md., assignors to Hercules Incorporated, Wilmington, Del.
Filed June 5, 1969, Ser. No. 830,824
Int. Cl. G01p *3/26*
U.S. Cl. 73—505
10 Claims

ABSTRACT OF THE DISCLOSURE

An instrument wherein the deflection of a fluid jet, induced for example by the angular movement of the instrument, produces a signal proportional to the deflection, and particularly such an instrument that is substantially self-contained to provide a closed fluid circuit that is relatively insensitive to transient temperature differentials, and in which the overall dimensions of the instrument have been minimized.

---

This invention relates to a fluid jet deflection type instrument, that is, an instrument wherein there is a fluid jet that is adapted to be deflected from a centered condition relative to a jet sensing means, the magnitude and direction of the deflection being used to produce an output signal that indicates the magnitude and direction of the force inducing the deflection of the jet.

An example of a fluid jet deflection type instrument is the angular movement sensing device that forms the subject matter of the copending United States patent application Ser. No. 632,239, filed Apr. 20, 1967, now Pat. No. 3,500,691, dated Mar. 17, 1970. In this device, the deflection of the jet from a centered condition relative to the sensing means is produced by the lateral movement of the sensing means during the interval of time that an increment of fluid, which may for convenience be referred to as air, is in transit in the jet from the nozzle to the sensing means. Thus, an increment of air that is directed in a centered manner onto the sensing means at the time it is discharged by the nozzle, will contact the sensing means in a non-centered condition. The amount and direction of the deflection of the increment of air from the centered condition is a function of the lateral movement of the sensing means while the increment of air was in transit. The amount of the deflection is thus proportional to the angular movement of the unit so that the signal produced by the sensing means varies with the amount of the jet deflection and can be calibrated to indicate the rate and direction of the movement. Another example of a fluid jet deflection type instrument is the accelerometer that forms the subject matter of the copending United States patent application Ser. No. 830,826, filed June 5, 1969.

The usefulness of a fluid jet deflection type instrument is often determined by the size of the unit as well as its other physical characteristics such as weight and power requirements, in addition to the usual considerations such as the sensitivity and the accuracy and linearity of the response, sensitivity to extraneous influences and forces that may be encountered in use, for example, shock and vibration, gravity or acceleration, tumbling, transient temperature variations, and variations in the voltage of the electrical supply.

Accordingly, the objects of this invention are to provide a fluid jet deflection type instrument which is substantially self-contained, requiring at most a minute outside source of power and remotely located electrical components. Other objects of this invention are to provide an instrument in which the physical size and weight have been reduced to a minimum and in which there is a minimum external electrical field that may interfere with other electrical circuits disposed in the immediate vicinity. Further objects of this invention are to provide an instrument that can be readily calibrated and assembled into an efficient and dependable unit.

With the above and other objects in view, a preferred embodiment of the present invention is hereinafter described with reference to the accompanying drawings, in which.

Figure 1:
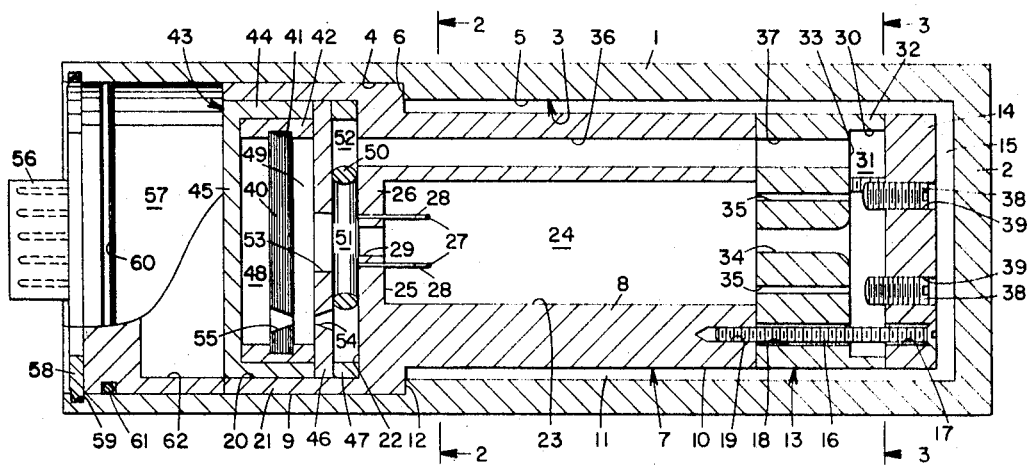
FIG. 1 is a sectional view longitudinally of an instrument embodying the present invention.

With reference to the drawings, there is illustrated a fluid jet deflection type instrument comprising a housing 1 having a continuous and preferably cylindrical side wall, the housing being closed at one end, which may be referred to as the nozzle end of the unit, by an end wall 2.

The housing 1 has a bore 3 that includes a large diameter portion 4 adjacent the open end or what is herein called the sensor end of the unit, and a reduced or small diameter portion 5 inwardly of the housing 1 from the large diameter portion 4. A shoulder 6 is formed at the intersection of the portions 4 and 5 of the bore 3.

A self-contained sealed unit 7 is inserted into the housing 1 from the open end thereof. The unit 7 comprises a substantially cylindrical body 8 having a large diameter portion 9 that is dimensioned to have a relatively snug sliding fit in the large diameter portion 4 of the bore 3 in the housing 1 and a small diameter portion 10. The diameter of the portion 10 is smaller than that of the small diameter portion 5 of the bore 3 whereby the portion 10 is supported in cantilever fashion within the housing 1 to provide an annular space 11 between the portion 5 of the bore 3 and the portion 10 of the body 8. The unit 7 is positioned endwise of the housing 1 by a shoulder 12 at the periphery of the body 8 between the portions 9 and 10, which shoulder 12 abuts against the shoulder 6 in the housing 1.

At the nozzle end of the unit 7, there is provided a nozzle member 13 and an end plate 14. The components are dimensioned such that the end plate 14 is spaced from the end wall 2 of the housing 1 to provide an air space 15 between the same. The components are secured in assembled relation by three screws 16 equally spaced angularly about the axis of the end plate 14 and disposed radially thereof adjacent to the periphery. The screws 16 extend loosely through holes 17 in the end plate 14 and holes 18 in the nozzle member 13, and are threaded into tapped holes 19 in the body 8.

The body 8 has a cavity 20 extending inwardly thereof from the end adjacent to the open end of the housing 1, which cavity is bounded by a relatively thin side wall 21 and a bottom surface 22 that is spaced endwise of the body 8 from the shoulder 12 to provide a section between the same that is sufficiently heavy to support the cantilevered small diameter portion 10 of the body 8. At its opposite end, that is, the end adjacent to the nozzle member 13, the body 8 has a blind bore 23 extending inwardly along the axis thereof to provide a cylindrical jet chamber 24. The chamber 24 thus has an open end adjacent to the nozzle member 13 and a closed end at the bottom of the bore, which is at a bottom surface 25 spaced endwise of the body 8 from the bottom surface 22 of the cavity 20 to provide a partition 26 between the cavity 20 and jet chamber 24.

Figure 2:
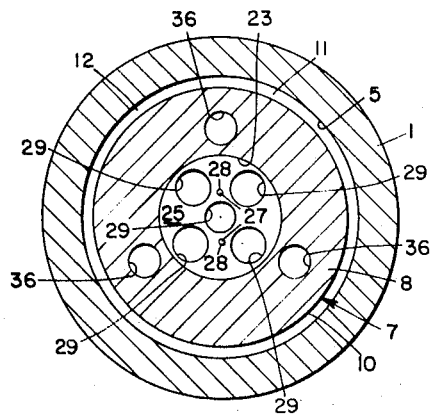
FIG. 2 is a sectional view taken substantially on the line 2—2 of FIG. 1.
Figure 3:
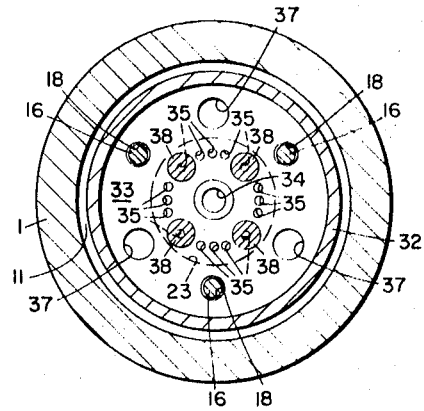
FIG. 3 is a sectional view taken substantially on the line 3—3 of FIG. 1.

The sensing means of the instrument comprises a pair of spaced sensing elements where electrical resistance varies with its temperature. As illustrated, the sensing elements comprise a pair of thermistors 27 that are adhesively secured to the free ends of a pair of glass rods 28 carried by the partition 26. The rods 28 may for example be mounted in the end wall 26 by adhesively securing the same in bores in the end wall and are arranged to extend into the jet chamber 24 from the partition 26 in a direction parallel to the axis of the chamber 24. The rods 28 are located symmetrically relative to the axis of the jet chamber 24 of a diameter thereof, with both of the thermistors spaced from the axis and from the side wall of the jet chamber 24. The partition 26 is provided with exhaust ports 29 (FIG. 2) that include a centrally disposed port aligned axially of the chamber 24 between the thermistor-supporting rods 28 and four outer ports that are arranged symmetrically about the rods 28. The thermistors 27 are thus supported symmetrically relative to a fluid jet directed axially of the jet chamber 24 and exhausted through the ports 29, and are spaced from the bottom surface 25 sufficient to avoid any disturbance of the flow as the jet is exhausted so that the flow over the thermistors will be smooth.

The nozzle member 13 has an axial bore 30 extending inwardly from the end thereof adjacent to the end plate 14 to provide a plenum chamber 31 that is bounded circumferentially by the relatively thin wall 32 and endwise by the end plate 14 and the bottom surface 33 of the bore 30. A nozzle 34 is formed concentrically of the nozzle member 13 with the intake end of the nozzle open into the plenum chamber 31 and the output end open into the end of the jet chamber 24 whereby the nozzle 34 will direct a fluid jet axially of the jet chamber onto the thermistors 27. The nozzle member 13 is also provided with a plurality of bores 35 surrounding and parallel to the axis of the nozzle 34, and extending from the plenum chamber 31 to the jet chamber 24. The bores 35, which are included within the subject matter of the copending U.S. patent application Ser. No. 632,238, filed Apr. 20, 1967, now Pat. No. 3,500,690 dated Mar. 17, 1970, introduce air into the space between the jet and the side wall of the jet chamber, and thus prevent the formation of a vacuum by aspiration by the jet, which vacuum tends to cause a cyclical flow of fluid in the jet-surrounding space within the jet chamber 24.

Air under pressure is supplied to the plenum chamber 31 by pump means disposed in the cavity 20, which pump means is connected to the plenum chamber 31 by conduit means including three bores 36 that extend endwise through the body 8 from the cavity 20. The bores 36 are connected in turn to the plenum chamber 31 by three comparable bores 37 in the nozzle member 13. The bores 36 surround and are parallel to the axis of the jet chamber 24 and are equally spaced angularly about the same in order to provide a symmetrical input to and thus a substantially uniform pressure in the plenum chamber 31. The bores 36 and 37 are also staggered relative to the holes 19 and 18 respectively to minimize interference with the flow of the fluid from the bores 37, through the plenum chamber 31, to the nozzle 34.

In order to adjust the jet into a cenetered relation relative to the thermistors 27 and thus to compensate for example for manufacturing or operating variations, there are provided a plurality of adjustment screws 38 threaded through bores 39 in the end plate 14, there being four of the screws 38 in the illustrated embodiment. The screws 38 are disposed symmetrically relative to the axis of the nozzle 34 and are turned down in the bores 39 so that the free ends thereof extend into the plenum chamber 31. By adjusting the screws 38 endwise in the plenum chamber 31, the flow patterns of the fluid from the bores 37 into and through the plenum chamber 31 to the nozzle 34 are altered to provide minute deflections of the jet discharged by the nozzle 34. This adjustment forms the subject matter of the copending U.S. patent application Ser. No. 830,828, filed June 5, 1969.

The illustrated pump means that is disposed within the cavity 20 forms the subject matter of the copending U.S. patent application Ser. No. 830,830, filed June 5, 1969. This pump means includes a pump plate 40 comprising a laminated pair of disc-like piezoelectric crystals which are adapted to be energized electrically by voltage of opposite polarity whereby one of the crystals expands and the other contracts. The plate 40 is thus bulged or buckled with the contrasting crystal on the inside or concave face of the plate and the expanding crystal on the outside or convex face of the plate. When the polarity of the voltage to the crystals is reversed, the plate 40 buckles in the opposite direction. Power is adapted to be supplied to the plate from an electrical circuit (not shown) that includes an oscillator that periodically reverses the voltage at a predetermined frequency, e.g., 2800 cycles per second. The pump plate 40 is thus vibrated at a relatively high frequency.

The pump plate 40 is mounted in a groove 41 internally of a ring-like mounting element 42 which is preferably made of a resilient material such as relative hard rubber that holds it firmly without impeding the vibration thereof or crushing the rim that is seated in the groove 41. The ring-like mounting element 42 is in turn mounted within a cup-like closure element 43 having a side wall 44 that is received with a close tolerance within the side wall 21 of the body 8 and an end wall 45 that acts to close the open end of the cavity 20. An orifice plate 46 and a ring-like spacer 47 are disposed between the inner or free edge of the side wall 44 of the closure element 43 and the bottom surface 22 of the cavity 20.

The groove 41 is formed substantially at the center of the mounting element 42 so that the mounting element 42 will also function as a spacer for the pump plate 40 to space the same from the end wall 45 and from the orifice plate 46 thereby defining a pump chamber 48 and an intake chamber 49 respectively. Divider means in the form of an O-ring 50 is disposed between the orifice plate 46 and the bottom surface 22 of the cavity 20 and divides the space between the plate 46 and surface 22 into a centrally located exhaust chamber 51 into which the ports 29 open and an annular pressure chamber 52 that surrounds the chamber 51 and into which the bores 36 open. The orifice plate 46 has an intake aperture 53 at the center thereof that connects the exhaust chamber 51 and the intake chamber 49. The orifice plate 46 is also provided with an outlet orifice 54 adjacent to the periphery thereof and interconnecting the intake chamber 49 and the pressure chamber 52. The orifice 54 is located angularly of the unit mid-way between a pair of the bores 36 of the body 8 so that air passing through the orifice 54 impinges upon a blank wall of the surface 22. The pump plate 40 is provided with a pump orifice 55 that is aligned endwise of the unit with the outlet orifice 54.

In operation, as the pump plate 40 vibrates, it functions in the nature of a diaphragm. As the pump plate 40 buckles in the direction in which the center thereof moves away from the end wall 45, the volume of the pump chamber 48 is expanded, thereby drawing air through the pump orifice 55 from the intake chamber 49. When the pump plate 40 buckles in the other direction, the center thereof moves toward the end wall 45 thereby decreasing the volume of the pump chamber 48. At this time, a change of air is expelled through the pump orifice 55 and carries across the intake chamber 49 and through the orifice 46 into the pressure chamber 52.

The successive charges of air impelled by the pump means through the orifice 54 into the pressure chamber 52 impinge upon the surface 22 and are diffused to create a relatively uniform pressure throughout the pressure chamber 52. From the pressure chamber 52, the air passes through the endwise connected bores 36 and 37 into the plenum chamber 31. From the plenum chamber 31, the air is discharged by the nozzle 34 as a laminar flow jet directed axially of the jet chamber 24 toward the thermistors 27. After passing over the thermistors, the fluid is exhausted through the ports 29 into the exhaust chamber 51, and from the exhaust chamber 51 through the intake aperture 53 into the intake chamber 49 from which it is drawn by the pump means and recirculated.

The jet is normally directed in a centered condition onto the thermistors 27 and thus imposes a uniform cooling effect upon both of the thermistors. When the jet is deflected relative to the thermistors 27, an unequal cooling effect is imposed upon the thermistors 27. Through the changes in the electrical resistance of the thermistors imposed by this cooling, or the different power requirements to maintain the thermistors at the equilibrium temperature in a bridge circuit, the difference in the cooling of the two beads can be compared to produce an output signal. With a jet having laminar flow and with an instrument having a designed operating range that is limited relative to the jet profile to the area in which there is substantially linear variation of the jet velocity, the output signal is substantially linear and is directly proportional to the jet deflection. Since the jet deflection is a function of the angular turn or other force or influence inducing the same, the output signal indicates the turn or other force or influence, and can be correspondingly calibrated.

In accordance with the invention forming the subject matter of the above noted application Ser. No. 632,239, the side wall of the jet chamber 24 serves to dampen the jet after it has been deflected and thereby prevents "hunting." At the same time, the diameter of the jet chamber 24 is sufficiently large to avoid having a surface effect upon the jet. Preferably, the diameter of the jet chamber is about four times the diameter of the nozzle 34.

In order to minimize the overall length of the unit, the nozzle 34 is as short as possible consistent with the formation of laminar flow at the pressures and flow rates involved, which, in the present instrument, may include a pressure of about 0.0005 p.s.i. in the plenum chamber 31 and a nozzle having a diameter of 0.125 inch and a length of 0.250 inch. The jet that is discharged under these circumstances has a velocity of 100 inches per second and the fluid consumption is less than two cubic feet per hour. Streamlining the intake end of the nozzle 34 is essential in order to achieve laminar flow under these conditions. The jet chamber 24 is also as short as possible, with the minimum length being limited by the sensitivity of the unit, that is, by the minimum deflection required to produce an accurately detectable signal.

The instrument in accordance with this invention is initially pre-assembled in the unit 7 with the nozzle member 13 and end plate 14 secured to the one end of the body 8 by the screws 16, and the spacer 47, orifice plate 46, pump plate 40 and closure element 43 inserted into and adhesively secured in the cavity 20 at the other end of the body 8. The unit 7 is then placed upon a test stand and is operated in the normal manner while the screws 38 are adjusted to center the jet onto the thermistors. After the jet is centered, the screw 38 may be locked in position for example by depositing an adhesive or a curable resin in the bore 39 outwardly of the screws 38. The pre-assembled unit 7 is then inserted into the housing 1 until the shoulders 6 and 12 are in abutment and is secured in position by an adhesive applied between the portion 4 of the bore 3 in the housing 1 and the portion 9 of the body 8. Closing the unit 7 by the end plate 14 and sealing the same in the housing 1 are preferably performed under controlled atmospheric conditions such as pressure and temperature to control for example the volume and moisture content of the gas in the system.

In the final assembly of the instrument, the electrical connections are made to the thermistors 27 and the pump plate 40, the lead wire of which may be brought into the open end of the housing 1 outwardly of the end wall 45 through appropriate grooves formed for example in the inner face of the wall 21. In the illustrated embodiment, these lead wires are connected to a plug type receptacle 56 of a connector 57 that is inserted into the open end of the housing 1 and is secured therein for example by an expansion type split ring 58 having a wedge-shaped outer edge that is adapted to enter a groove 59 in the side wall of the housing 1. The connector 57 is preferably also provided with a peripheral groove 60 that receives a sealing ring 61 for insuring against the escape of fluid from the system. The receptacle 56 provides for connecting the unit to an externally disposed electrical circuit (not shown), which may be the same as that which is disclosed and claimed in the above noted application Ser. No. 632,239. Alternatively, the various electrical components may be mounted in the connector 57 such as in an internal cavity 62 so that the only connections afforded by the receptacle 56 would be a power input and a signal output.

The spaces 11 and 15 between the housing 1 and the unit 7 afford a dead air space for insulating the unit 7 against transient temperature changes which may produce hot or cold spots on the unit 7 and which, in turn, could produce a non-uniform temperature in the air in the unit 7. A temperature differential in the air in the unit induces a deflection of the jet because of the change in the density of the air, which deflection would produce an erroneous output signal. The dead air space insures that any transient temperatures will be absorbed more gradually and thus will raise the temperature of the air in the unit uniformly.

While the fluid in the instrument is herein referred to as air, it will be obvious that other fluids, for example, helium which has a relatively high cooling capacity, can also be used and in some instances may be preferred over air.

What we claim and desire to protect by Letters Patent is:

1. A fluid jet deflection type instrument designed to provide a closed fluid circuit that is relatively insensitive to transient temperature differentials and in which the overall dimensions of the instrument have been minimized, said instrument comprising in combination:
   a housing having a continuous side wall and an end wall closing one end thereof,
   a unit supported in said housing and including a body having a jet chamber endwise thereof, a plenum chamber at the end of said body adjacent the closed end of the housing, and a nozzle between said plenum chamber and said jet chamber for directing a laminar flow fluid jet axially of said jet chamber,
   electrical sensing means mounted in said body at the end of said jet chamber opposite from said nozzle and disposed symmetrically relative to said nozzle, said electrical sensing means adapted to respond to deflection relative thereto of a fluid jet discharged by said nozzle and to produce an electrical output signal,
   said body having a cavity at the end opposite from the closed end of said housing and having a partition between said cavity and said jet chamber,
   an orifice plate in said cavity and spaced from said partition and divider means for dividing the space between said orifice plate and said partition into a central exhaust chamber and a pressure chamber surrounding the same,
   said partition having exhaust ports interconnecting said jet chamber and said exhaust chamber,
   means defining an intake chamber at the opposite side of the orifice plate from said exhaust and pressure chambers,
   said orifice plate having an aperture interconnecting said intake chamber and said exhaust chamber and an orifice interconnecting said intake chamber and said pressure chamber, pump means spaced from said orifice plate within said cavity for impelling charges of fluid through said orifice into said pressure chamber, and conduit means extending endwise of said body outwardly of the jet chamber and interconnecting said pressure chamber and said plenum chamber.

2. A fluid jet deflection type instrument in accordance with claim 1 in which the periphery of said body about said jet chamber and plenum chamber is supported in spaced relation relative to said housing and to provide insulation between said body and said housing.

3. A fluid jet deflection type instrument in accordance with claim 1 in which said conduit means interconnecting said pressure chamber and said plenum chamber comprises a plurality of bores endwise of the body and substantially equally spaced angularly about the periphery of the jet chamber.

4. A fluid jet deflection type instrument in accordance with claim 3 in which the orifice in said orifice plate is disposed angularly between a pair of said bores.

5. A fluid jet deflection type instrument in accordance with claim 1 in which said electrical sensing means comprises a pair of thermistors and posts extending from said partition for supporting said thermistors in spaced relation relative to each other and to said partition.

6. A fluid jet deflection type instrument in accordance with claim 5 in which said exhaust ports are disposed symmetrically relative to said thermistors.

7. A fluid jet deflection type instrument in accordance with claim 1 in which said divider means comprises a resilient element compressed between said partition and said orifice plate.

8. A fluid jet deflection type instrument in accordance with claim 1 wherein the means defining an intake chamber on the one side of said orifice plate includes a pump plate forming the vibrating part of said pump means and disposed in said cavity in spaced relation relative to said orifice plate and to the end wall that closes the said cavity.

9. A fluid jet deflection type instrument in accordance with claim 8 in which said pump means comprises said pump plate and means for electrically vibrating said pump plate.

10. A fluid jet deflection type instrument in accordance with claim 9 having an end wall disposed in spaced relation to said pump plate to provide a pump chamber and closing said cavity, said pump plate having a pump orifice interconnecting said intake chamber and said pump chamber.

References Cited

UNITED STATES PATENTS

| | | | |
|---|---|---|---|
| 1,841,607 | 1/1932 | Kollsman | 73—180 |
| 3,107,630 | 10/1963 | Johnson et al. | 103—1 X |
| 3,352,485 | 11/1967 | Niki et al. | 103—173 |
| 3,361,067 | 1/1968 | Webb | 103—1 |
| 3,500,690 | 3/1970 | Schuemann | 73—516 |

JAMES J. GILL, Primary Examiner

H. GOLDSTEIN, Assistant Examiner